(No Model.)  3 Sheets—Sheet 1.

J. H. SHELLEY.
DUST AND FLOUR SEPARATOR.

No. 465,543.  Patented Dec. 22, 1891.

Witnesses:
J. Staib
Chas. H. Smith

Inventor:
James H. Shelley
per Lemuel W. Serrell
atty

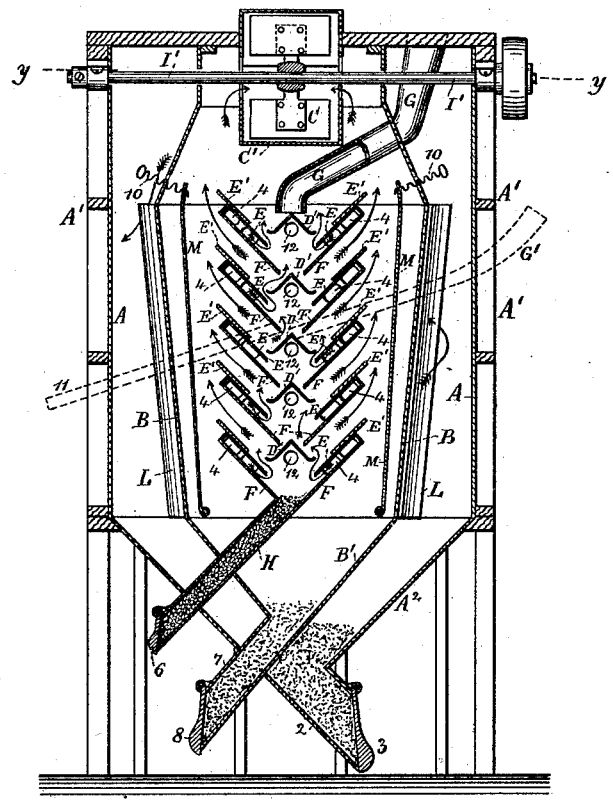

(No Model.)

3 Sheets—Sheet 3.

J. H. SHELLEY.
DUST AND FLOUR SEPARATOR.

No. 465,543.

Patented Dec. 22, 1891.

Witnesses:
J. Staib
Geo. T. Pinckney

Inventor:
James H. Shelley
per Lemuel W. Serrell
Atty

UNITED STATES PATENT OFFICE.

JAMES H. SHELLEY, OF BROOKLYN, NEW YORK, ASSIGNOR TO HIMSELF AND JOHN G. BUEHLER, OF SAME PLACE.

DUST AND FLOUR SEPARATOR.

SPECIFICATION forming part of Letters Patent No. 465,543, dated December 22, 1891.

Application filed February 9, 1891. Serial No. 380,737. (No model.)

*To all whom it may concern:*

Be it known that I, JAMES H. SHELLEY, a citizen of the United States, residing at Brooklyn, in the county of Kings and State of New York, have invented an Improvement in Dust and Flour Separators, of which the following is a specification.

In separating dust, light grain, and foreign substances from wheat, &c., difficulty has heretofore been experienced, especially in cities, in consequence of the dust being discharged in the atmosphere.

The object of my invention is to separate the dust, light grains, and foreign substances without discharging the dust into the external atmosphere, and to separate bran and similar substances from flour, and this is accomplished by a peculiarly-constructed apparatus containing two cases, one within the other, the grain or other material being exposed to the action of an upward current of air in the inner case, and the dust or fine particles are caused to descend in the outer case, and they are thrown off centrifugally and away from the openings leading into the inner case, and the heavier of the lighter portions—such as imperfect grains or seeds— are retained within the inner case, and there are three separations, one of the clean perfect grain or flour from the center of the inner case, the next of lighter matters and imperfect grain or finer particles of flour from the bottom of the inner case, and the third of the dust from the outer case.

Figure 1:
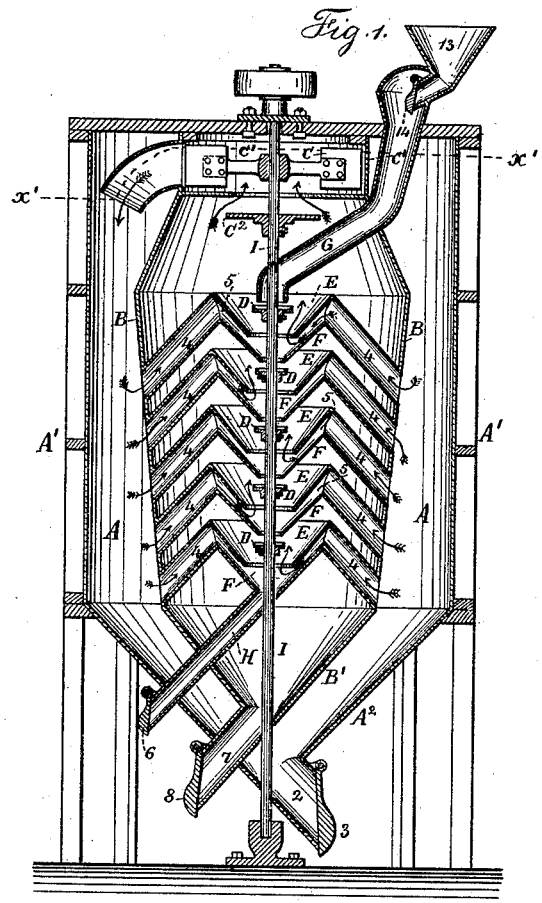
Figure 2:
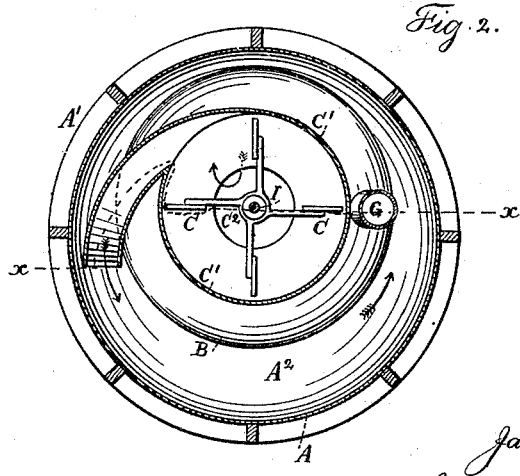
Figure 5:
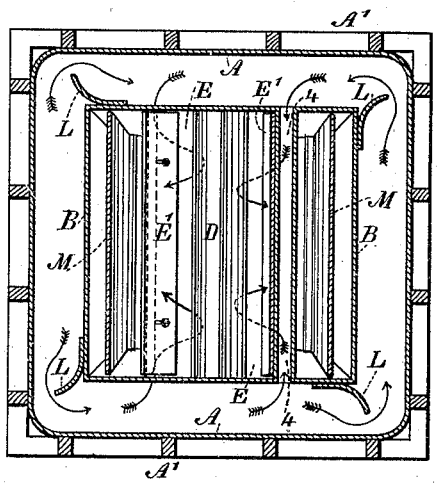

In the drawings, Figure 1 is a vertical section of the apparatus complete, near the line $x\ x$ of Fig. 2. Fig. 2 is a sectional plan view at the line $x'\ x'$, with the top of the case removed. Fig. 3 is a vertical section near the line $y'\ y'$ of Fig. 4. Fig. 4 is a sectional plan view at the line $y\ y$ of a modification of my improvements; and Fig. 5 is a sectional plan view at the line $z\ z$, Fig. 3.

I make use of an outer case A of suitable size and shape, and it may be supported in a wooden frame A' and provided with a hopper-shaped bottom $A^2$ with a separate spout 2, at the end of which a check-valve 3 is preferably provided.

Within the case A is a secondary case B, and there is a fan-blower C to draw the air out of the inner case and cause it to circulate around within the outer case, and in the inner case are openings 4 for the air to pass through as it circulates.

Within the inner case B there are central deflectors D and pairs of hoppers E F, the upper hopper E of each pair having a larger opening in the middle than the lower hopper F, and the material that is to be freed from dust and foreign substances is supplied upon the central deflector D by the pipe G, and it passes from the edge of the upper central deflector upon the upper hopper E, and from there it falls to the next hopper F, that deflects the material upon the next central deflector D below, and so on from the top to the bottom of the apparatus, there being any desired number of pairs of hoppers and central deflectors, and the outer edges of the hoppers E and F are united in pairs by the annular partitions 5, and there are openings 4 through the inner case B into the spaces between the hoppers E and F in each pair. Hence it will be apparent that as the fan-blower C causes an upward current of air through the inner case B, the air enters by the openings 4 between the pairs of hoppers and is drawn upwardly through the central opening of the upper hopper E, and through the stream of grain or other material flowing over the edge of such hopper, thereby taking out the dust from such material, and the cleansing operation commences at the top and continues as the grain or other material passes from the upper hopper of each pair of hoppers in succession and descends, and such material is exposed to a progressive cleansing operation, which is perfected at the bottom, and such material in its clean condition passes from the bottom hopper F of the lowest series of hoppers by a pipe H, which leads to the outside of the apparatus, and is preferably provided with a check-valve 6; and it will be apparent that during this cleansing operation the grain or other material is exposed to the upward current of air, as such grain flows from the lower edges of the lower hoppers F and from the central deflectors D. It will be noticed that the inner case B is larger at the upper part than it is at the lower part, and the ascending current of air is deflected toward the outer part of the case by the respective hoppers, and as the air passes into the larger space the movement of the air is lessened and the inertia of the particles of solid matter, carried by the air, causes them to pass toward the inner surface of the case B and out of the line of movement of the ascending current of air, and such particles of solid matter fall rapidly within the case B to the hopper-shaped bottom B' thereof, and into the chute or delivery pipe 7, at the lower end of which there is preferably a check-valve 8.

The check-valves 3, 6, and 8 are preferably weighted sufficiently to prevent them from opening except by the weight of the accumulation of solid material behind and above them, and therefore there will be a progressive discharge as such materials may accumulate above the respective check-valves, and the entire apparatus being almost air-tight the air will simply be circulated around through the apparatus, passing up the central portion of the inner case through the blower and down between the inner and the outer case and through the openings 4 in the case B to the center thereof and then up to the blower. The outer case A is preferably of uniform diameter, and in consequence of the inner case B being conical such inner case B is nearest the wall of the outer case at the upper part thereof and the air and the dust carried by it are projected by the blower C into the upper part of the case A and the inertia carries the solid particles toward the inside of the outer case A, and as the air circulates in a downward direction the air and the solid particles are directed, as hereinafter described, so that they travel spirally around the inner portion of the outer case. Thereby the centrifugal action tends to throw the solid particles toward such inner surface and as the atmosphere circulates downwardly between the inner and the outer cases the space increases in width and the speed of movement is constantly diminished, because the air is drawn progressively through the openings 4 and in the lower portion of the space between the outer and the inner case there is no circulation of air and hence the particles of solid matter fall freely into the hopper-bottom $A^2$ of the outer case. By this arrangement the solid materials are caused to deposit out of the atmosphere with great rapidity and but little of dust is drawn from the outer case into the inner case through the openings 4.

The description heretofore given applies to both the forms of apparatus represented in the drawings. In Figs. 1 and 2 a horizontal blower upon a vertical shaft or axis I is represented. In Figs. 3 and 4 the axis I' of the blower is horizontal. In Figs. 1 and 2 the deflectors D are upon the vertical shaft I and revolve with the same, and the grain or other material is thrown off from such deflectors by the centrifugal force. In Figs. 3 and 4 the deflectors D' are stationary and inclined upon their upper surfaces. In all other respects the apparatus are similar.

In Figs. 1 and 2 the air-opening from the fan-blower case C' is curved and slightly inclined downwardly, to promote the centrifugal action that throws the particles of solid matter toward the inner surfaces of the outer case A, and I sometimes place the inner case B eccentric to the outer case A, as seen in Fig. 2, in order that the circulation of the atmosphere may be rendered more uniform in psssing outwardly and downwardly from the curved exit of the blower-case, to make about one complete revolution within the outer case as it passes down and is drawn through the openings 4.

In Fig. 3 the apparatus is shown, corresponding generally to that in Fig. 4, except that the blower is upon a horizontal axis and the deflectors, hoppers, and cases may be circular; but in Fig. 4 I have illustrated the manner in which the parts may be arranged for a rectangular case, in which instance the hoppers E and F may be made of straight plates, extending across the case B, the openings 4 through the case B being between the hoppers of the pairs of hoppers and in the portions of the inner case that come at the ends of the straight hopper-plates E and F, and the deflectors D in that case will be prismatic or trough-shaped; and it is to be understood that the operations of the parts heretofore described are not changed by the differences of shape in the respective parts herein set forth.

When the cases A and B are rectangular, as represented in Fig. 4, it is advantageous to employ deflectors L or wings near the angles of the inner case B, so as to cause the atmosphere, as it is circulated around between the two cases, to pass outwardly toward the inner portions of the outer case, and thereby the dust and fine particles that may be carried by the atmosphere are thrown outwardly and away from the current of air which circulates toward the inner case as it is drawn in through the openings 4 in such case.

In order to vary the space into which the air may expand previous to entering the blower, I sometimes provide shields M, formed of two or more sections, hinged or otherwise connected near the bottom portion of the inner case B and capable of being moved inwardly from the interior surface of such inner case to a greater or less extent. This may be effected by rods 10, connected with the upper portions of such shields and passing through the inner case, and notched or otherwise constructed so as to hold such shields in any position to which they may be placed; and usually it is preferable to connect the lower ends of these shields at sufficient distances from the interior surface of the inner case B for any dust that may pass outside such shields to descend into the hopper and pass away therefrom.

The peculiar construction of the inner and outer cases and the action of the current of air, as aforesaid, remain the same regardless of the number of hoppers and air-inlets, and it will be also apparent that in an apparatus where the hoppers and deflectors are sufficiently numerous the grain or other material may be supplied by two or more inlet-pipes.

The dotted lines in Fig. 3 represent a second supply-pipe G' for grain or other material introduced above the central deflector D in the vertical range. When this pipe G' is used, the grain or other material from the supply-pipe G passes off by a pipe (indicated by the dotted lines 11) leading from the bottom of the second hopper F.

It is advantageous to make use of a cap C² near the entrance to the blower-case in order that the atmosphere may be drawn uniformly into such case.

I find it advantageous to make the hoppers E F of the same exterior diameter and to make the inner case B larger in the upper part, as shown; but in all cases the relative measurements are such that the air-spaces around such hoppers and within the case B will increase upwardly.

In cases where flour is being treated it is important to vary the inclined surface of the hoppers E, up which the particles are carried by the air before falling over the upper edges of such hoppers and descending in the case B. This can be accomplished by the plates E', Fig. 3, that may be drawn up more or less and clamped or otherwise held in position, and air may be admitted at the openings 12, beneath the deflectors D, and in that case only the upper hoppers E may be made use of.

In order to more effectually close the apparatus and prevent the air passing in or out thereof, the supply-chute 13, that discharges the material into the pipe G, may have a valve 14 at the end, that will only open by the weight of the grain or other material, and the air will not be drawn in at this place to an appreciable extent.

I claim as my invention—

1. The combination, with the outer case A and inner case B, of a blower acting to circulate the atmosphere upwardly in the inner case and downwardly in the space between the inner and outer cases, the inner case having numerous openings one below the other for the air to pass through, hoppers within the inner case, and deflectors for directing the materials as they descend from one hopper to the next, a supply-pipe for the material, a delivery-pipe for the cleansed grain or other material, and discharge pipes or openings from the hopper-shaped bottoms of the inner and outer cases, substantially as set forth.

2. The combination, with the outer case and its hopper-shaped bottom, of an inner case, the space between the outer and inner cases being widest in the lower portion, a hopper-shaped bottom to the inner case and delivery pipe or opening, a supply-pipe, deflectors and hoppers within the inner case, and pipes leading from openings in the inner case to the hoppers, and a blower for circulating the air within the apparatus, substantially as set forth.

3. The outer case A, inner case B, and hopper-shaped bottoms and delivery-pipes to the respective cases, in combination with a fan-blower acting to circulate the air upwardly in the inner case and downwardly between the inner and outer cases, and a vertical shaft passing through the inner case, deflectors upon the shaft, a supply-pipe opening above the upper deflector, and double hoppers and pipes opening through the inner case to the spaces between the hoppers, substantially as set forth.

4. The combination, with the outer case having a bottom and delivery-opening, of the inner case, smaller at the bottom part than at the upper part and having a delivery-opening, the double hoppers within the inner case, air-tubes opening through the inner case to the spaces between the double hoppers, deflectors between the hoppers, a supply-tube leading the material to the upper deflector, and a blower for circulating the air upwardly in the inner case and downwardly in the outer case, substantially as set forth.

5. The combination, with the outer case A, having a hopper-shaped bottom and delivery-opening, of the inner case B, having a hopper-shaped bottom and delivery-opening and placed eccentric to the outer case, the air-spaces between the outer and inner cases being wider at the lower than at the upper portion, a blower and its case at the upper end of the inner case, said inner case being contracted from its larger diameter to the blower-case, and a discharge-mouth from the blower-case for directing the air into the wider portion of the air-space between the two cases, deflectors and hoppers within the inner case, and air-pipes opening through the inner case to the hoppers, substantially as set forth.

6. The combination, in a dust-separating apparatus having a blower at the top for circulating the air from the inner to the outer case, of an imperforate external case and an internal perforated case smallest at the lower end, so that the intervening space increases in size downwardly, the air and dust being discharged into this space, so that the motion of the air lessens in the direction of the subsiding dust and increases upwardly in the inner perforated case as it passes to the blower, substantially as set forth.

7. The combination, with the outer and inner cases, of a blower for circulating the air upwardly in the inner case and downwardly between the outer and inner cases, and hoppers and deflectors within the inner case, there being numerous openings one above the other through the inner case for admitting the air to pass between the hoppers and deflectors, and the supply and delivery pipes, substantially as set forth.

Signed by me this 3d day of February, 1891.

JAMES H. SHELLEY.

Witnesses:
  GEO. T. PINCKNEY,
  HAROLD SERRELL.